United States Patent [19]

Brignall

[11] 4,173,926
[45] Nov. 13, 1979

[54] TORTILLA PIE SHELL HOLDER

[76] Inventor: Clifford N. Brignall, P.O. Box 391, Boulder City, Nev. 89005

[21] Appl. No.: 957,325

[22] Filed: Nov. 3, 1978

[51] Int. Cl.² .............................................. A47J 36/20
[52] U.S. Cl. ...................................... 99/349; 99/353; 99/403; 99/426; 99/450; 294/99 R
[58] Field of Search ................ 99/352, 353, 349, 403, 99/426, 432, 439, 450, 433, 427, 409, 418, DIG. 15; 294/33, 99 R; 100/219, 234

[56] References Cited

U.S. PATENT DOCUMENTS

| | | | |
|---|---|---|---|
| 1,672,738 | 6/1928 | Stampley | 99/411 |
| 1,962,570 | 6/1934 | Nelson | 294/99 R |
| 2,191,275 | 2/1940 | Fink | 99/349 |
| 2,201,566 | 5/1940 | Voelker | 294/99 |
| 2,570,374 | 10/1951 | Pompa | 99/426 |
| 2,719,480 | 10/1955 | Prickett | 99/403 |
| 2,891,814 | 6/1959 | Idoine | 99/450 UX |
| 3,020,826 | 2/1962 | Silva | 99/426 |
| 3,693,537 | 9/1972 | Johnson | 99/426 |
| 3,759,165 | 9/1973 | Wallace | 99/409 |
| 3,817,163 | 6/1974 | Kizziar | 99/353 |

*Primary Examiner*—Billy J. Wilhite
*Attorney, Agent, or Firm*—Fulwider, Patton, Rieber, Lee & Utecht

[57] ABSTRACT

A holder for forming and cooking a tortilla into a pie shell. The holder includes nestable apertured pans which are initially vertically separated to receive a tortilla to be cooked. The holder is then dipped into hot oil and the pans moved towards each other to form the pliable tortilla into a pie shell shape. Thereafter, the holder remains within such frying pan until the tortilla is cooked to a firm consistency. The holder may also be utilized with regular pie crust dough rather than a tortilla.

6 Claims, 7 Drawing Figures

U.S. Patent  Nov. 13, 1979  4,173,926
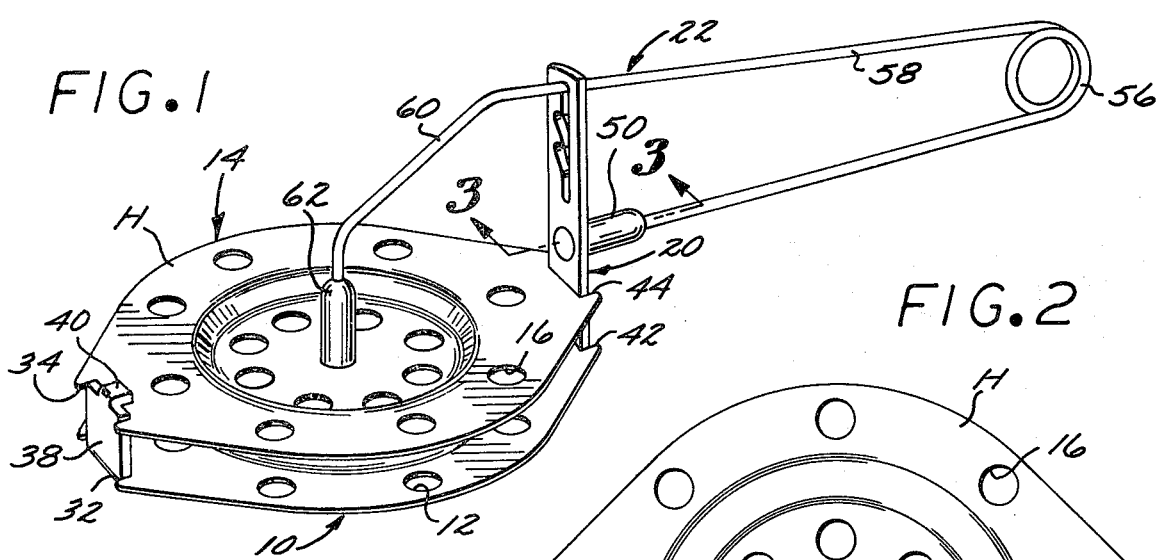
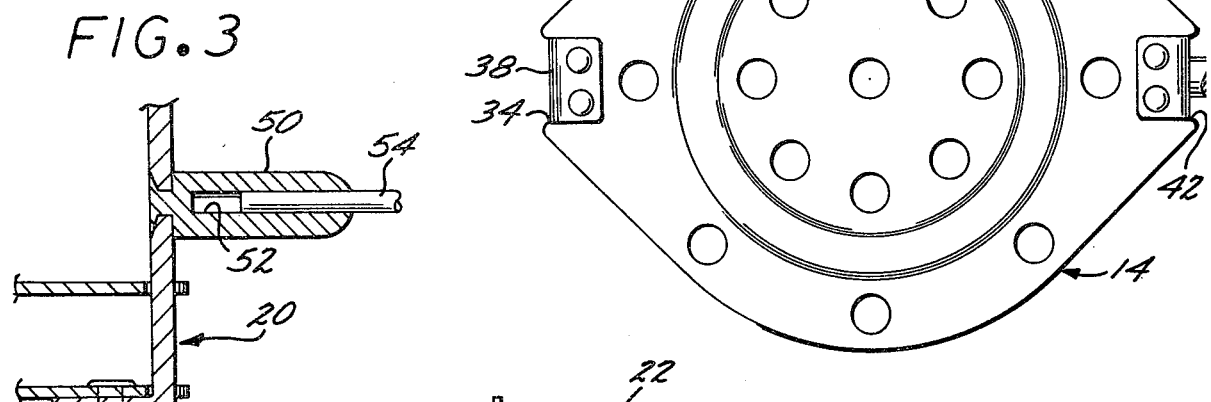
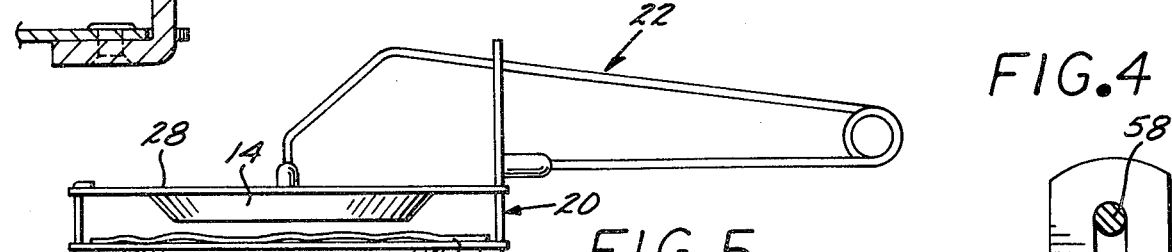
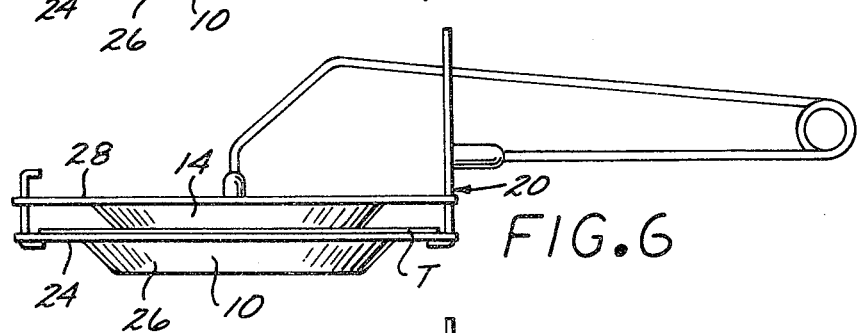
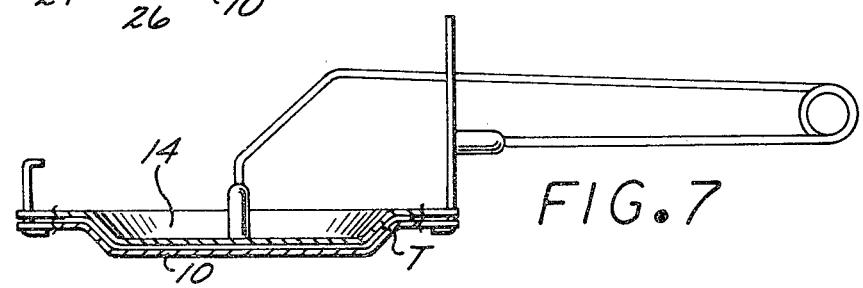

4,173,926

TORTILLA PIE SHELL HOLDER

BACKGROUND OF THE INVENTION

Both corn and flower tortillas have heretofore been cooked by dipping a holder therefor into a common type pan such as a hot oil-containing skillet. Additionally, tortillas have been formed into various configurations by hand-manipulated instruments. The tortilla is initially pliable but becomes rigid upon cooking, and it is comparatively difficult to adequately support the tortilla within a skillet to its desired shape during the cooking operation. Additionally, a manual procedure results in the possibility that the person cooking the tortilla is apt to become burned with splattering oil or the like. It is also comparatively difficult to remove the cooked tortilla from a pan once the cooking operation has been completed.

BRIEF DESCRIPTION OF THE INVENTION

It is a major object of the present invention to provide a holder for forming and cooking a tortilla into a pie shell shape.

Another object of the present invention is to provide a tortilla holder of the above-described nature which is simple of design and rugged of construction whereby it may be manufactured at low cost and yet will provide a long and trouble-free service life.

Yet a further object of the present invention is to provide a tortilla holder of the above-described nature wherein a tortilla may be quickly and easily positioned for forming and cooking, and yet with such tortilla being readily removed from the holder after the forming and cooking thereof.

A more particular object of the present invention is to provide a tortilla holder of the above-described nature utilizing nestable apertured pans which are relatively vertically movable while locked against relative horizontal movement, with the pans being intitially vertically separated to received an uncooked tortilla. Such pans are then positioned within hot cooking oil rendering the tortilla pliable. Next, the pans are moved towards one another to cause the tortilla to assume a pie shell shape and the tortilla is cooked to a firm consistency. In place of a tortilla, the pie shell may be formed from flat pie crust dough.

These and other objects and advantages of the present invention will become apparent from the following detailed description of a preferred embodiment of the invention, when taken in conjunction with the appended drawings.

BRIEF DESCRIPTION OF THE DRAWINGS

FIG. 1 is a perspective view showing a preferred form of tortilla holder embodying the present invention;

FIG. 2 is a broken top plan view of said tortilla holder;

FIG. 3 is a vertical sectional view taken in enlarged scale along line 3—3 of FIG. 1;

FIG. 4 is a further enlarged fragmentary view of a support forming a part of said tortilla holder; and FIGS. 5, 6 and 7, are reduced side views of said tortilla holder showing how a torilla is cooked into a pie shell shape by said holder.

DESCRIPTION OF THE PREFERRED EMBODIMENT

Referring to the drawings, a preferred form of tortilla holder H embodying the present invention includes a lower sheet metal pan generally designated 10 that is dished downwardly into the general configuration of a conventional pie pan. The pan 10 is formed over its surface with a plurality of apertures 12. An upper sheet metal pan generally designated 14 is similar in configuration to lower pan 10, but is of smaller dimensions whereby upper pan 14 can nest within lower pan 10. Upper pan 14 is formed over its surface with a plurality of apertures 16. One side of lower pan 10 is provided with an up-standing bracket generally designated 20 to which is affixed a generally horizontally handle, generally designated 22. Upper and lower pans 10 and 14 are provided with means for locking them against relative horizontal movement while permitting their relative vertical movement, such means are described in detail hereinafter.

More particularly, lower pan 10 includes a flat horizontal rim 24 from which integrally extends a downwardly tapered frusto-conical dish 26. Upper pan 14 is similar in construction, utilizing a flat horizontal rim 28 from which integrally depends a frusto-conical dish 30. The side of rims 24 and 28 opposite handle 22 are formed with vertically aligned notches 32 and 34, as shown particularly in FIGS. 1 and 2. The notches 32 of lower pan 10 rigidly receive an upstanding guide 38, the upper end of which is formed with an inwardly extending up-stop 40. The width of guide 38 generally corresponds to the width of the notches 32 and 34, with the rim 28 of upper pan 14 being freely slidable vertically relative to guide 38. The sides of lower and upper rims 28 and 24, opposite notches 32 and 34, are formed with similar vertically aligned notches 42 and 44. Lower notch 42 rigidly receives the upstanding bracket 20. Notch 44 of upper pan 14 is freely slidable vertically along the lower portion of bracket 20. It will therefor be noted that guide 32 and bracket 20 cooperate with notches 34 and 44 so as to permit upper pan 14 to freely undergo vertical movement relative to lower pan 10, while locking the pans 10 and 14 against relative horizontal movement.

The intermediate portion of bracket 20 is provided with a sidewardly extending boss 50 which as shown particularly in FIG. 3, is provided with a horizontally extending bore 52. Bore 52 horizontally slidably receives the lower arm 54 of handle 22. The outer end of arm 54 is configured into a coil spring 56, the upper end of which merges into the upper arm 58 of handle 22. Upper arm 58 is directed inwardly to the center of upper pan 14 and includes a downwardly inclined portion 60 which is rigidly affixed to an upstanding socket 62 having its lower portion rigidly affixed to the center of upper pan 14. The spring portion 56 of handle 22 constantly biases upper handle arm 58 and hence upper pan 14 upwardly.

The upper portion of bracket 20 is formed with a stop slot 66. Such stop slot includes an upper notch 68 and a lower notch 70.

In the operation of the aforedescribed tortilla holder H, the upper handle arm 58 is initially disposed at the upper end of stop slot 66 in the position indicated in FIGS. 1, 4 and 5. Referring now to FIG. 5, it will be noted that at this time upper pan 14 is disposed in its uppermost position relative to lower pan 10, whereby a tortilla T to be cooked may be positioned between the upper and lower pans. Next, upper handle arm 58 is urged downwardly against the bias afforded by spring 56 into upper stop 68, whereby the underside of upper pan 14 engages tortilla T, so as to retain such tortilla fixed relative to holder H. This position of the parts of the holder and tortilla T is shown in FIG. 6. With the parts of the holder H arranged in the position of FIG. 6, the upper and lower pans are lowered into a bath of hot cooking oil. After a short time of immersion in the oil, the tortilla T becomes sufficiently pliable that the upper pan 14 may be lowered into its lowermost position shown in FIG. 7 by further downward movement of upper handle arm 58 from upper stop 68 into lower stop 70. At this time the tortilla is configured into a pie shell shape. The tortilla will remained immersed within the hot oil bath until such tortilla has been cooked to a firm consistency. Thereafter, the cooked tortilla is raised out of the hot oil bath and the parts of the holder returned to their initial position of FIG. 5 so as to permit the cooked tortilla to be removed from lower pan 10 and another tortilla inserted between the pans. During the cooking operation, the apertures 12 and 16 permit ready access of the cooking oil to the upper and lower surfaces of the tortilla T.

Either flower or corn tortillas may be utilized with the holder of the present invention. It has been determined that the flower tortillas may be utilized to prepare appetizing desserts, the pie shells defined by the tortillas receiving various flavorful fillings, such as fruit and dairy products. Pie shells formed from corn tortillas may receive various taco fillings, Spanish rice tostada ingredients and the like. The nature of the ingredients received by pie shells formed by the tortilla holder of the present invention are limited only by the imagination of the cook. It should further be noted that the holder of the present invention may be employed to form and cook pie shells from conventional pie crust dough, either of the home prepared or commercially prepared type.

Various modifications and changes may be made with respect to the foregoing detailed description without departing from the spirit of the present invention.

I claim:

1. A holder for forming a tortilla or the like into a pie shell and then cooking said tortilla in hot oil, said holder comprising:

a lower apertured pan;
an upper apertured pan similar in shape to said lower pan and movable downwardly within the confines of said lower pan, with the space between said lower and upper pans receiving an uncooked tortilla when said pans are vertically separated;
guide means interposed between said pans to restrain their relative horizontal movement while permitting their relative vertical movement;
an upstanding bracket secured to said lower pan; a handle attached to said bracket, said handle having its inner end secured to said upper pan; and lock means interposed between said bracket and said handle to selectively control the vertical position of said upper pan relative to said lower pan, whereby said holder and the uncooked tortilla therein may be lowered into said oil to render said tortilla pliable, whereafter said upper pan is lowered toward said lower pan to deform said tortilla into a pie shell shape until said tortilla is cooked.

2. A holder as set forth in claim 1, wherein said guide means include notch means formed in said pans that receive said bracket and an upstanding guide secured to said lower pan on the side thereof opposite said bracket.

3. A holder as set forth in claim 1, wherein said handle is formed with spring means that bias said upper pan upwardly relative to said lower pan.

4. A holder as set forth in claim 1, wherein said handle includes a lower arm fixed to said bracket, the outer end of said lower arm being configured into a coil spring, the upper end of which spring merges into an upper arm that extends inwardly through said bracket to be rigidly affixed to said upper pan, with said coil spring biasing said upper pan away from said lower pan.

5. A holder as set forth in claim 2, wherein said handle is formed with spring means that bias said upper pan upwardly relative to said lower pan.

6. A holder as set forth in claim 4, wherein said bracket is formed with a stop slot that includes an upper notch and a lower notch, with the upper arm of said handle being selectively disposable within the upper end of said stop slot, said upper notch or said lower notch so as to control the vertical spacing of said upper pan relative to said lower pan, and with said coil spring releasably retaining said upper arm within the upper end of said slot and said notches.

* * * * *